United States Patent
Fagiano et al.

(10) Patent No.: US 9,304,865 B2
(45) Date of Patent: Apr. 5, 2016

(54) EFFICIENT HANDING OF SEMI-ASYNCHRONOUS RAID WRITE FAILURES

(71) Applicant: INTERNATIONAL BUSINESS MACHINES CORPORATION, Armonk, NY (US)

(72) Inventors: Christophe Fagiano, Mouans-Sartoux (FR); Itzhack Goldberg, Hadera (IL); Carl E. Jones, Tucson, AZ (US); Moriel Lechtman, Haifa (IL); Neil Sondhi, Budapest (HU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 148 days.

(21) Appl. No.: 14/225,692

(22) Filed: Mar. 26, 2014

(65) Prior Publication Data

US 2015/0278019 A1    Oct. 1, 2015

(51) Int. Cl.
*G06F 11/00* (2006.01)
*G06F 11/14* (2006.01)
*G06F 11/10* (2006.01)
*G06F 11/20* (2006.01)

(52) U.S. Cl.
CPC ........ *G06F 11/1451* (2013.01); *G06F 11/1092* (2013.01); *G06F 11/2069* (2013.01)

(58) Field of Classification Search
CPC ............ G06F 11/1092; G06F 11/1451; G06F 11/1466; G06F 11/1474; G06F 11/2064; G06F 11/2069
See application file for complete search history.

(56) References Cited

U.S. PATENT DOCUMENTS

| 6,711,632 | B1 | 3/2004 | Chow et al. |
| 7,089,383 | B2* | 8/2006 | Ji .................... G06F 11/2066 707/999.202 |
| 7,181,479 | B2* | 2/2007 | Suzuki .............. G06F 11/1474 707/615 |
| 7,299,378 | B2* | 11/2007 | Chandrasekaran . G06F 11/1474 714/15 |
| 2003/0014523 | A1 | 1/2003 | Teloh et al. |

(Continued)

FOREIGN PATENT DOCUMENTS

| EP | 0980041 A2 | 2/2000 |
| JP | 2012081629 A | 4/2012 |
| WO | 2006023990 A2 | 3/2006 |
| WO | 2006119100 A2 | 11/2006 |

OTHER PUBLICATIONS

Parissis et al., "BLAST: Off-the-Shelf c. Hardware for Building an Efficient Hash-Based Cluster Storage System" Network and Parallel Computing, 2009 Sixth IFIP International Conference.

(Continued)

*Primary Examiner* — Joseph Kudirka
(74) *Attorney, Agent, or Firm* — Griffiths & Seaton PLLC

(57) ABSTRACT

For efficient handing of semi-asynchronous RAID write failures using a processor device in a computing environment, a write operation is committed on a primary copy of data on a primary entity while sending the data to a secondary entity while awaiting an acknowledgment by the secondary entity. The acknowledgment indicates to the primary entity that metadata for the write operation has arrived at the secondary entity without necessarily indicating the data has arrived at the secondary entity. The acknowledgment is sent from the secondary entity regardless of a write failure and allowing the secondary entity to perform a recovery operation if a write failure occurs.

20 Claims, 4 Drawing Sheets

(56) References Cited

U.S. PATENT DOCUMENTS

| | | | |
|---|---|---|---|
| 2007/0073985 A1* | 3/2007 | Wilkes | G06F 11/2074 711/161 |
| 2007/0195692 A1 | 8/2007 | Hagglund et al. | |
| 2007/0220059 A1 | 9/2007 | Lu et al. | |
| 2015/0269039 A1* | 9/2015 | Akirav | G06F 11/2007 714/4.11 |

OTHER PUBLICATIONS

Wood et al., "PipeCloud: using causality to overcome speed-of-light delays in cloud-based disaster recovery" 13 pages, Proceedings of the 2nd ACM Symposium on Cloud Computing (SOCC '11), ACM, New York, NY.

* cited by examiner

EFFICIENT HANDING OF SEMI-ASYNCHRONOUS RAID WRITE FAILURES

BACKGROUND OF THE INVENTION

1. Field of the Invention

The present invention relates in general to computers, and more particularly to efficient handing of semi-asynchronous RAID write failures in a computing environment.

2. Description of the Related Art

In today's society, computer systems are commonplace. Computer systems may be found in the workplace, at home, or at school. A data processing system typically includes a processor subsystem having at least one central processing unit (CPU), an input/output (I/O) subsystem, a memory subsystem and a bus subsystem. The memory subsystem of the data processing system typically includes a data storage system having a controller connected to a back end storage. The controller controls the flow of data between the data processing system and the back end storage. The controller includes a cache memory that is typically implemented by static memories. During operation, the cache memory serves as a temporary store for data associated with a write I/O request.

These data processing systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent reliability demands and failure tolerances imposed by many software applications. In particular, responses to I/O requests in such data storage systems can be poorly defined in the wake of a failure that disrupts the processing of I/O requests. Accordingly, it would be desirable to improve the failure tolerance of data storage systems without compromising reliability and data availability.

SUMMARY OF THE DESCRIBED EMBODIMENTS

In one embodiment, a method is provided for efficient handing of semi-asynchronous RAID write failures, in a computing environment. In one embodiment, by way of example only, a write operation is committed on a primary copy of data on a primary entity while sending the data to a secondary entity while awaiting an acknowledgment by the secondary entity. The acknowledgment indicates to the primary entity that metadata for the write operation has arrived at the secondary entity without necessarily indicating the data has arrived at the secondary entity. The acknowledgment is sent from the secondary entity regardless of a write failure and allowing the secondary entity to perform a recovery operation if a write failure occurs.

In another embodiment, a computer system is provided for efficient handing of semi-asynchronous RAID write failures, in a computing environment. The computer system includes a computer-readable medium and at least one processor in operable communication with the computer-readable medium. The processor commits a write operation on a primary copy of data on a primary entity while sending the data to a secondary entity while awaiting an acknowledgment by the secondary entity. The acknowledgment indicates to the primary entity that metadata for the write operation has arrived at the secondary entity without necessarily indicating the data has arrived at the secondary entity. The acknowledgment is sent from the secondary entity regardless of a write failure and allowing the secondary entity to perform a recovery operation if a write failure occurs.

In a further embodiment, a computer program product is provided for efficient handing of semi-asynchronous RAID write failures, in a computing environment. The computer-readable storage medium has computer-readable program code portions stored thereon. The computer-readable program code portions include a first executable portion that commits a write operation on a primary copy of data on a primary entity while sending the data to a secondary entity while awaiting an acknowledgment by the secondary entity. The acknowledgment indicates to the primary entity that metadata for the write operation has arrived at the secondary entity without necessarily indicating the data has arrived at the secondary entity. The acknowledgment is sent from the secondary entity regardless of a write failure and allowing the secondary entity to perform a recovery operation if a write failure occurs.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
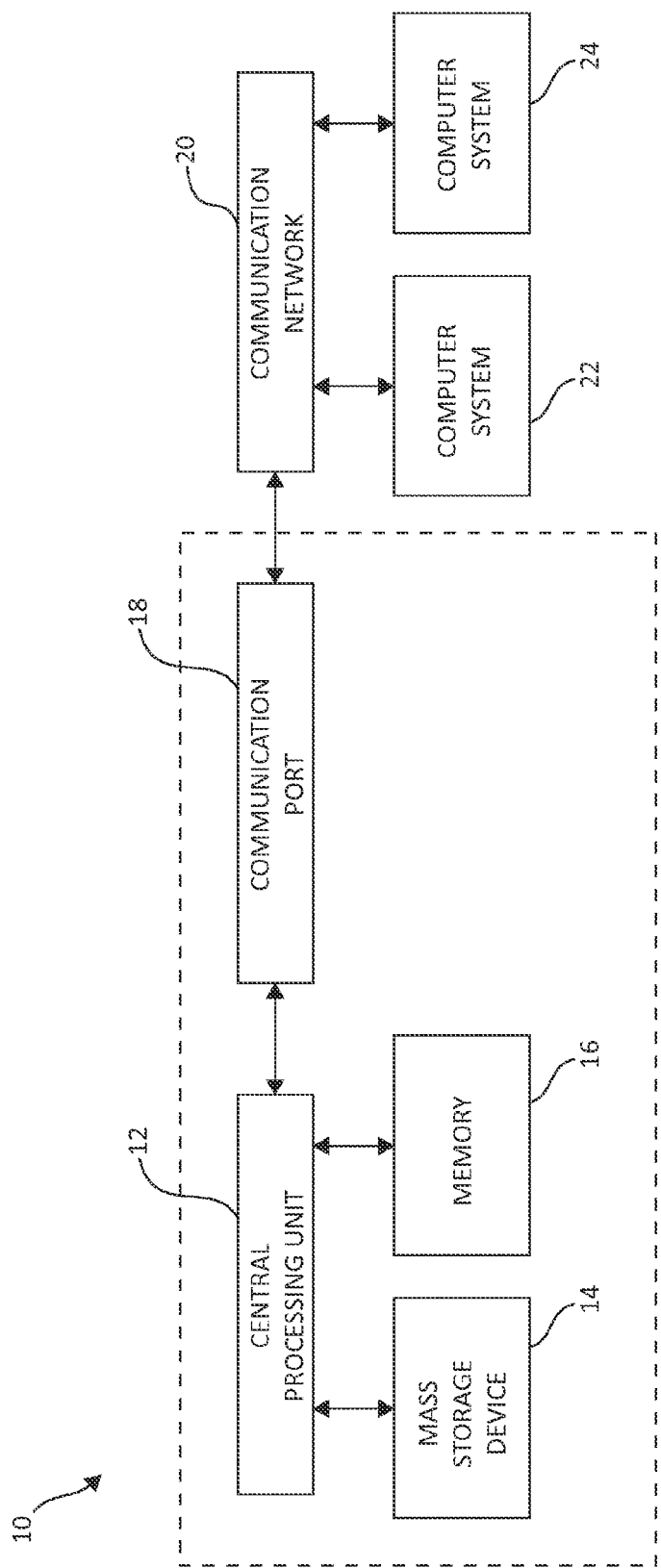
FIG. 1 is a block diagram illustrating a computing system environment having an example storage device in which aspects of the present invention may be realized.

As mentioned above, large amounts of data have to be processed daily and the current trend suggests that these amounts will continue being ever-increasing in the foreseeable future. To handle such large amounts of data, cluster-computing architectures have recently advanced such that clusters of computers are now being used in the academic and commercial community to compute solutions to complex problems. Cluster computing offers three distinct features for scientific research and corporate computing: high performance, high availability, and less cost than dedicated super computers. Cluster computing comprises a multiplicity of conventional workstations, servers, PCs, and other computer systems interconnected by a high-speed network to provide computing services to a multiplicity of clients. Each computer system (PC, workstation, server, mainframe, etc.) is a node of the cluster. The cluster integrates the resources of all of these nodes and presents to a user, and to user applications, a Single System Image (SSI). The resources, memory, storage, processors, etc. of each node are combined into one large set of resources. To a user or user application, access to the resources is transparent and the resources are used as though present in a single computer system.

The cluster computing architectures may include the use of redundant array of independent disks (RAID). RAID storage uses multiple disks in order to provide fault tolerance, to improve overall performance, and to increase storage capacity in a system. With RAID technology, data can be mirrored on one or more other disks in the same array, so that if one disk fails, the data is preserved. Thanks to a technique known as "striping," RAID also offers the option of reading or writing to more than one disk at the same time in order to improve performance. In this arrangement, sequential data is broken into segments, which are sent to the various disks in the array, speeding up throughput. Also, because a RAID array uses multiple disks that appear to be a single device, it can often provide more storage capacity than a single disk. RAID devices use many different architectures, depending on the desired balance between performance and fault tolerance. These architectures are called "levels." Standard RAID levels include the following: Level 0 (striped disk array without fault tolerance), Level 1 (mirroring and duplexing), Level 2 (error-correcting coding), Level 3 (bit-interleaved parity), Level 4 (dedicated parity drive), Level 5 (block interleaved distributed parity), Level 6 (independent data disks with double parity) and Level 10 (a stripe of mirrors). Some devices use more than one level in a hybrid or nested arrangement, and some vendors also offer non-standard proprietary RAID levels.

For the most part, computing systems, including the cluster computing architectures, face a significant challenge to meet the increasingly stringent reliability demands and failure tolerances imposed by many software applications. In particular, responses to I/O requests in such data storage systems can be poorly defined in the wake of a failure that disrupts the processing of I/O requests. Accordingly, a need exists to improve the failure tolerance and/or errors resulting during read/write operation of data storage systems without compromising reliability and data availability.

For example, data associated with an input/output (I/O) request from host data processing system may be stored in a data storage system. An acknowledgement (ACK) may be sent from a controller to host data processing system once the data associated with write I/O request has been stored in the data storage system. Sometimes, write operations between host data processing system, controller, and/or the data storage system may be disrupted by an event failure. Examples of an event failure may include, without limitation, read/write operation failure, a host server failure, a kernel failure, an application failure, a storage controller failure, a network failure, etc. Any of the event failures may be associated with a power failure.

Moreover, writing to RAID storage devices, which are configured for higher resiliency and redundancy, implies that any write operation is performed to at least two different physical drives. Being a high-availability/high reliability storage system implies that the ACK is sent to a host only after the storage system stores at least two copies of the data on independent failure boundaries to eliminate any single point of failure (SPOF) that may lead to a data loss. Hence, a failure to write to either the primary copy and/or the secondary one, results in a write failure, which is returned to the host's application. The handling of at least two concurrent failures is outside the scope of the storage system design point, (other than the RAID6, which may handle two concurrent failures.) Upon receiving an error (i.e. the lack of an ACK) the host can reissue the write command or, (though a less dependable recovery but still an acceptable recovery method per SCSI standards) read the locations off the storage that the failed operation attempted to write, and based on the contents read back, decide on the next actions. Partial writes failures, where a write to just one copy fails, put the burden of recovery on the hosts. However, internal storage recovery attempts in the storage system can and do extend the write latency, as they are done in the data-path, and may also cause the applications to time-out and fail altogether. Had the storage system been able to conduct the recovery operation on the secondary storage device (e.g., secondary node, secondary copy, and/or secondary disk, etc.) outside the data-path, many recoverable issues in the storage could be resolved internally without exposing them to the hosts' applications and also reduce the write latency for the good path (when there are no problems) and for the bad path (when the initial write on secondary fails). Furthermore, the storage system can give more efficient and faster answers, such as failing a component sooner. In so doing, the extended period of storage system degradation (e.g., such as when a problem is recognized only after numerous failing hosts' level recovery attempts that are just succession of rewrites) is reduced. Thus, a need exists to both improve the storage performance and increase the storage system resiliency. By ensuring data redundancy at all times and through, assuming more responsibility either for autonomous self-healing or quicker recognition of an unrecoverable problem and failing the misbehaving component faster, the storage systems may be enhanced.

To address the challenges discussed above, in one embodiment, by way of example only, the present invention provides a solution for efficient handing of semi-asynchronous RAID write failures, in a computing environment. In one embodiment, by way of example only, a write operation is committed on a primary copy of data on a primary entity while sending the data to a secondary entity while awaiting an acknowledgment by the secondary entity. The acknowledgment indicates to the primary entity that metadata for the write operation has arrived at the secondary entity without necessarily indicating the data has arrived at the secondary entity. The acknowledgment is sent from the secondary entity regardless of a write failure and allowing the secondary entity to perform a recovery operation if a write failure occurs.

If the secondary entity fails to commit the data on the secondary entity, the write operation may be failed on the secondary entity, and/or a rebuild process on the secondary entity is triggered to complete a full redundant state of the data on the secondary entity.

If a double concurrent write failure occurs where the secondary entity is performing a retry of the write operation and the primary copy of the data on the primary entity is lost, the present invention may perform at least one of forcing the secondary entity to become a new primary entity, and/or returning a read operation failure by the secondary entity to an application when a read operation of a stale data block arrives.

A mark is set on a data allocation table during the write operation on the secondary entity. The data block is marked as stale in the data allocation table prior to the acknowledgment being sent by the secondary entity, and the acknowledgment is used for the write operation to return a success notification to the primary entity prior to committing the data on the secondary entity. Internal recovery actions are allowed to be attempted and/or a new write operation is performed/executed to a stale data block for turning the stale data block to a valid data block by delaying a processing operation of the write failure of the secondary copy. The acknowledgment is sent from the secondary entity to the primary entity after the data block is marked as stale.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
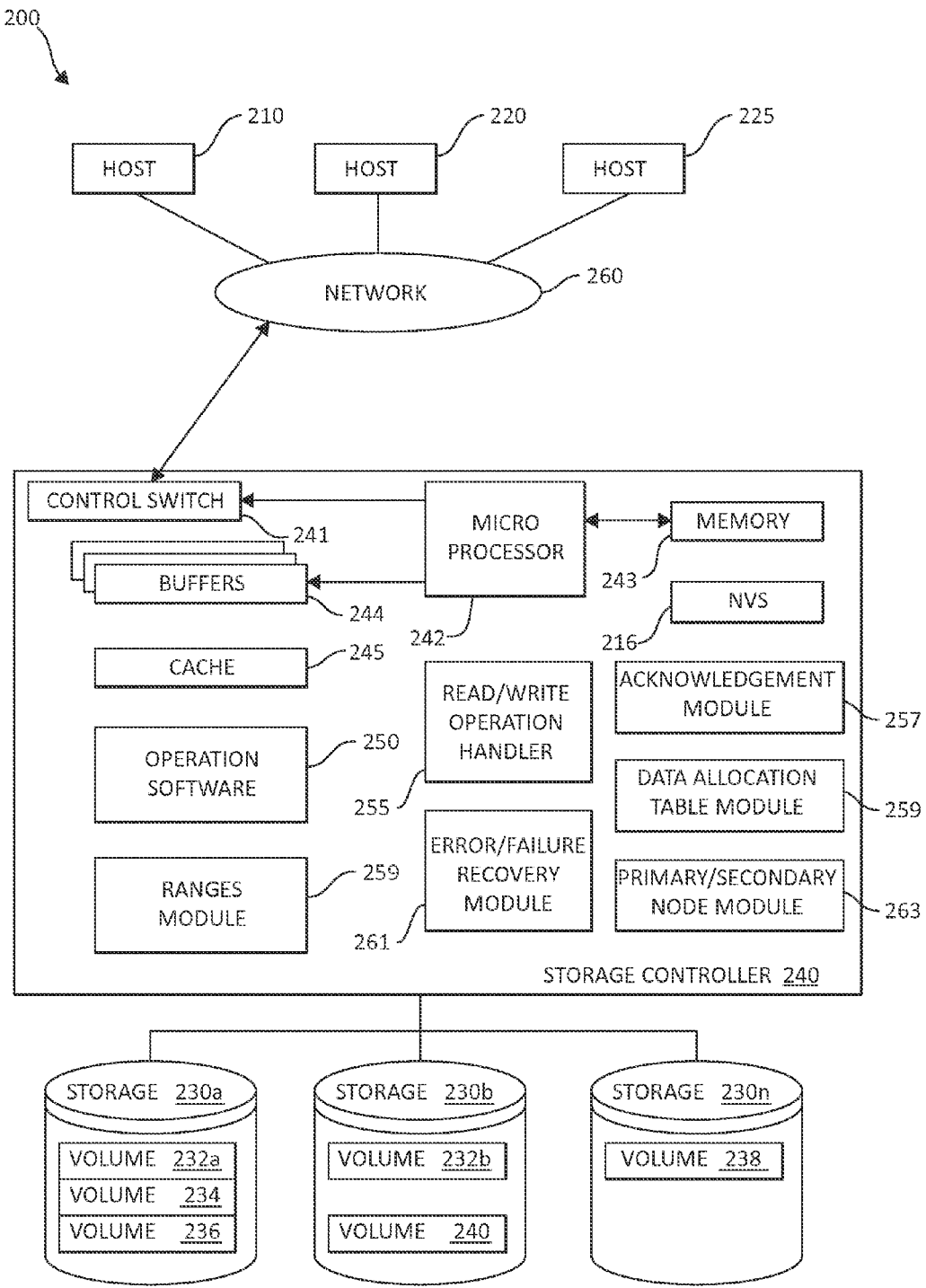
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a read/write operation handler 255, an acknowledgment module 257, a data allocation table module 259, an error/failure recovery module 261, and a primary/secondary node module 263. The read/write operation handler 255, the acknowledgment module 257, the data allocation table module 259, the error/failure recovery module 261, and the primary/secondary node module 263 may work in conjunction with each and every component of the storage controller 240, the hosts 210, 220, 225, and storage devices 230. The read/write operation handler 255, the acknowledgment module 257, the data allocation table module 259, the error/failure recovery module 261, and the primary/secondary node module 263 may be structurally one complete module or may be associated and/or included with other individual modules. The read/write operation handler 255, the acknowledgment module 257, the data allocation table module 259, the error/failure recovery module 261, and the primary/secondary node module 263, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the read/write operation handler 255, the acknowledgment module 257, the data allocation table module 259, the error/failure recovery module 261, and the primary/secondary node module 263, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, read/write operation handler 255, the acknowledgment module 257, the data allocation table module 259, the error/failure recovery module 261, and the primary/secondary node module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the read/write operation handler 255, the acknowledgment module 257, the data allocation table module 259, the error/failure recovery module 261, and the primary/secondary node module 263, may also be located in the cache 245 or other components. As such, one or more of the read/write operation handler 255, the acknowledgment module 257, the data allocation table module 259, the error/failure recovery module 261, and the primary/secondary node module 263, maybe used as needed, based upon the storage architecture and users preferences.

As described herein, the present invention provides a solution for efficient handing of semi-asynchronous RAID write failures. In one embodiment, the present invention is restricted to a RAID storage device type architecture, which serves all of its READ I/O from its primary copy only. In an alternative embodiment, the present invention is not restricted to RAID storage device type architecture and may be implemented in a variety of computing type architectures. For example, one computer architecture (e.g., IBM®) design point allows for an elegant and simple implementation of the described herein. Under one computer architecture (e.g., IBM®) design, the primary copy is excluded from the computing system with the secondary copy becoming a new primary copy and the rest of the recovery will create a new secondary copy off the new primary copy (e.g., the converted secondary copy). The focus of the description herein is handling of a write failure on the secondary copy alone and relying on that design to address all other issues.

Because of historical reasons and the need to be backward compatible with storage behavior, when RAID systems are based on single disks, the RAID systems seem to take on a pessimistic approach and, cater best to failures so that a failure is recognized and handled as soon as possible. A write failure is returned to the host after exhausting internal re-write operations, which are transparent to the hosts. Thus the present invention provides a solution to handle a good path (e.g., a non-failed path) and storage problems internally, and if the system cannot handle and fix the failures, the present invention reports those failures to the application layer at the last possible time (e.g., using a timer, a predetermined time, and/or calculation). Internal recovery procedures are provided to address write-failures as long as the failed writes are not consumed through a read. To do so, in one embodiment, the present invention commits a write on the primary copy and sends the data to the secondary entity awaiting an ACK from the secondary entity. The ACK, as described herein, means that the metadata for the write operation (specifically the write addresses) had arrived at the other end (e.g., the secondary entity), but does not mean that the data itself was successfully committed there. In other words, the data may have and/or may not have been successfully committed. The present invention allows for the secondary node to try recovery actions without negatively affecting the write latency, which will be acknowledged as soon as the primary receives the ACK from the secondary. If the secondary node fails to commit the data on its end, the secondary node can fail the relevant component (e.g., a disk and/or the entire module) and trigger a rebuild process that will return the whole storage into a full redundant state when that rebuild is complete (e.g., rebuild on the secondary node).

In the event of a double concurrent failure, where the second node is in the midst of a write re-try and/or other plausible recovery actions and/or the primary node/copy is lost thereby forcing the secondary entity (e.g., secondary node) into becoming the new primary entity (e.g., primary node), the secondary entity may return a read failure to a hosts' applications when a read of a stale block arrives, before any successful write was made to the secondary entity. The handling of the write error of the secondary copy is delayed to the very last possible time, allowing for internal recovery actions to be attempted and/or for a fresh new host write operation to be written to the stale block thereby turning the block to be a valid block. It should be noted that if manual intervention is required to recover stale blocks, the secondary node has all those uncommitted writes waiting as they were sent to it and were received successfully based on the ACK it had sent to the primary early on.

In one embodiment, each data storage system/module (which controls a set of storage systems such as disks or other type of storage devices) have a fixed stale table. For example, in one computer architecture (e.g., IBM® and/or the XIV® GEN-3) have 12 3 TB disks in each module. Half of the disks' space is used for secondary copies. Assuming the granularity that is tracked is of 4 KB, then the size of the stale table is around 100 MB or 200 MB. As the table is of fix size, there are no issues with data allocation schemes and latencies. In one embodiment, a bit is set to either "on" or "off" and such setting should always succeed. If the operation doesn't succeed, such failure indicates a significant problem with the data storage system/module (not merely a disk) and calls for a timely failing of the respective module so that the hosts will be able to choose alternate path. This enables the host to be more efficient and fast for their work and, in doing so, minimizes the performance degradation experienced currently, when the recognition of an interface module problems takes too long.

In one embodiment, by way of example only, the secondary node sends the ACK to the primary entity right after the secondary node marks the respective block as stale. The semi-asynchronous ACK allows for the write operation to return a success to the host before the data is committed on the secondary entity. This provides for faster write operation, yet it doesn't expose the host to any data inconsistency event, even if there are concurrent double failures. If, considering a worst-case scenario, there is a failure of a read of a stale block, if an intervention operation is required, all data that would have been on the secondary node is still available based on use of the operations described herein of the present invention. In case there are number of writes targeting the very same data block, all pending writes are aborted so that the latest data ends up written.

Figure 3:
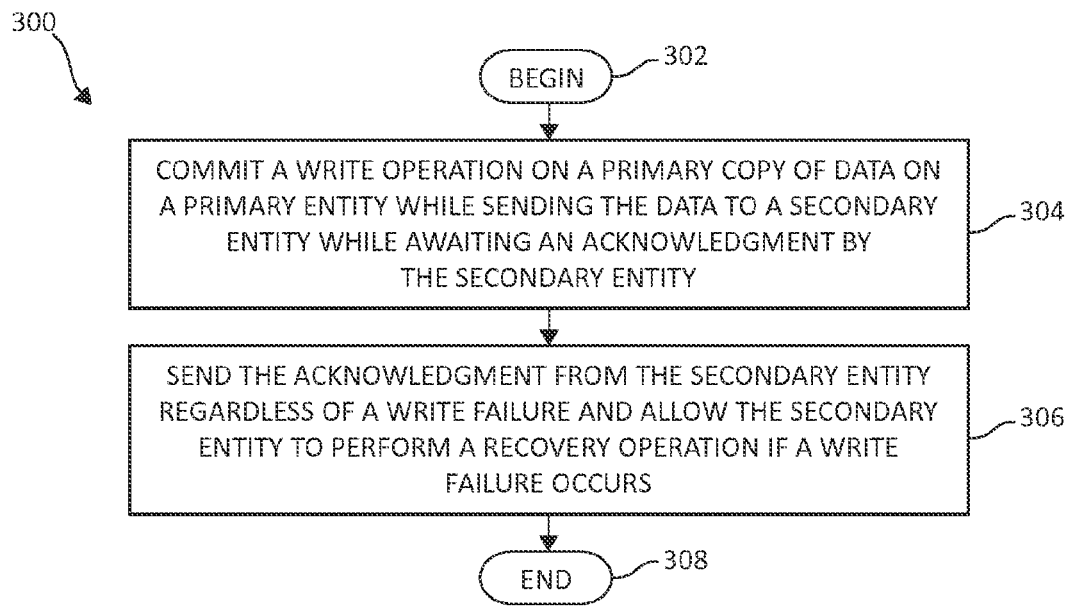
FIG. 3 is a flowchart illustrating an exemplary method for efficient handing of semi-asynchronous RAID write failures in which aspects of the present invention may be realized.

FIG. 3 is a flowchart illustrating an exemplary method 300 for efficient handing of semi-asynchronous RAID write failures in which aspects of the present invention may be realized. The method 300 begins (step 302) by committing a write operation on a primary copy of data on a primary entity while sending the data to a secondary entity while awaiting an acknowledgment by the secondary entity (step 304). The acknowledgment indicates to the primary entity that metadata for the write operation has arrived at the secondary entity without necessarily indicating the data has arrived at the secondary entity. The acknowledgment is sent from the secondary entity regardless of a write failure and allowing the secondary entity to perform a recovery operation if a write failure occurs (step 306). The method 300 ends (step 308).

Figure 4:
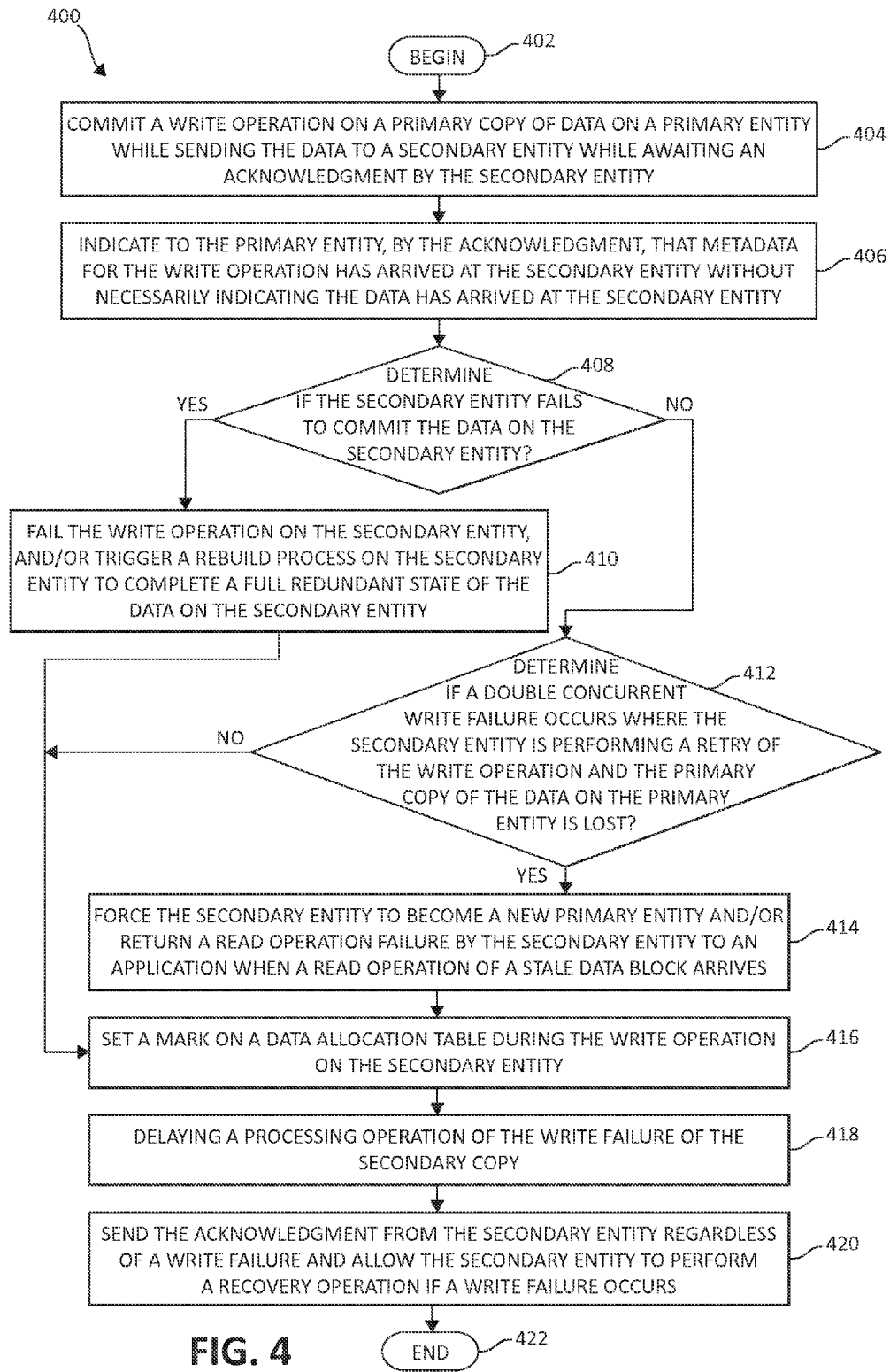
FIG. 4 is a flowchart illustrating an additional exemplary method for efficient handing of semi-asynchronous RAID write failures in which aspects of the present invention may be realized.

FIG. 4 is a flowchart illustrating an additional exemplary method 400 for efficient handing of semi-asynchronous RAID write failures in which aspects of the present invention may be realized. The method 400 begins (step 402) by committing a write operation on a primary copy of data on a primary entity while sending the data to a secondary entity while awaiting an acknowledgment by the secondary entity (step 404). The method 400 indicates to the primary entity by the acknowledgment that metadata for the write operation has arrived at the secondary entity without necessarily indicating the data has arrived at the secondary entity (step 406). The method 400 determines if the secondary entity fails to commit the data on the secondary entity (step 408). If yes, the method 400 fails the write operation on the secondary entity, and/or triggers a rebuild process on the secondary entity to complete a full redundant state of the data on the secondary entity (step 410) and then moves to step 416. If no, the method 400 determines if a double concurrent write failure occurs where the secondary entity is performing a retry of the write operation and the primary copy of the data on the primary entity is lost (step 412). If yes, the method 400 either forces the secondary entity to become a new primary entity and/or returns a read operation failure by the secondary entity to an application when a read operation of a stale data block arrives (step 414) and then moves to step 416. If no, the method 400 sets a mark on a data allocation table during the write operation on the secondary entity (step 416). The method 400 allows internal recovery actions to be attempted and/or a new write operation to be performed on a stale data block for turning the stale data block to a valid data block by delaying a processing operation of the write failure of the secondary copy (step 418). The method 400 sends the acknowledgment from the secondary entity regardless of a write failure and allow the secondary entity to perform a recovery operation if a write failure occurs (step 420). In one embodiment, the acknowledgment is sent from the secondary entity to the primary entity after the data block is marked as stale. The method 400 ends (step 422).

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient handling of semi-asynchronous RAID write failures using a processor device in a computing environment, the method comprising:

committing a write operation on a primary copy of data on a primary entity while sending the data to a secondary entity while awaiting an acknowledgment by the secondary entity, wherein the acknowledgment indicates to the primary entity that metadata for the write operation has arrived at the secondary entity with or without indicating that the data has committed on the secondary entity; and sending the acknowledgment from the secondary entity regardless of a write failure and allowing the secondary entity to perform a recovery operation if a write failure occurs.

2. The method of claim 1, further including, if the secondary entity fails to commit the data on the secondary entity, performing at least one of:

failing the write operation on the secondary entity, and triggering a rebuild process on the secondary entity to complete a full redundant state of the data on the secondary entity.

3. The method of claim 2, further including, if a double concurrent write failure occurs where the secondary entity is performing a retry of the write operation and the primary copy of the data on the primary entity is lost, performing each one of:

forcing the secondary entity to become a new primary entity, and returning a read operation failure by the secondary entity to an application when a read operation of a stale data block arrives.

4. The method of claim 3, further including allowing for one of internal recovery actions to be attempted and performing a new write operation to the stale data block for turning the stale data block to a valid data block by delaying a processing operation of the write failure of the secondary copy.

5. The method of claim 1, further including setting a mark on a data allocation table during the write operation on the secondary entity.

6. The method of claim 5, further including performing at least one of:
   marking the data block as stale in the data allocation table prior to the acknowledgment being sent by the secondary entity, and
   using the acknowledgment for the write operation to return a success notification to the primary entity prior to committing the data on the secondary entity.

7. The method of claim 6, further including sending the acknowledgment from the secondary entity to the primary entity after the data block is marked as stale.

8. A system for efficient handling of semi-asynchronous RAID write failures in a computing environment, the system comprising:
   at least one processor device operable in the computing environment, wherein the at least one processor device:
   commits a write operation on a primary copy of data on a primary entity while sending the data to a secondary entity while awaiting an acknowledgment by the secondary entity, wherein the acknowledgment indicates to the primary entity that metadata for the write operation has arrived at the secondary entity with or without indicating that the data has committed on the secondary entity, and
   sends the acknowledgment from the secondary entity regardless of a write failure and allowing the secondary entity to perform a recovery operation if a write failure occurs.

9. The system of claim 8, wherein the at least one processor device, if the secondary entity fails to commit the data on the secondary entity, performs at least one of:
   failing the write operation on the secondary entity, and
   triggering a rebuild process on the secondary entity to complete a full redundant state of the data on the secondary entity.

10. The system of claim 9, wherein the at least one processor device, if a double concurrent write failure occurs where the secondary entity is performing a retry of the write operation and the primary copy of the data on the primary entity is lost, performs each one of:
   forcing the secondary entity to become a new primary entity, and
   returning a read operation failure by the secondary entity to an application when a read operation of a stale data block arrives.

11. The system of claim 10, wherein the at least one processor device allows for one of internal recovery actions to be attempted and performing a new write operation to the stale data block for turning the stale data block to a valid data block by delaying a processing operation of the write failure of the secondary copy.

12. The system of claim 8, wherein the at least one processor device sets a mark on a data allocation table during the write operation on the secondary entity.

13. The system of claim 12, wherein the at least one processor device performs at least one of:
   marking the data block as stale in the data allocation table prior to the acknowledgment being sent by the secondary entity, and
   using the acknowledgment for the write operation to return a success notification to the primary entity prior to committing the data on the secondary entity.

14. The system of claim 13, wherein the at least one processor device sends the acknowledgment from the secondary entity to the primary entity after the data block is marked as stale.

15. A computer program product for efficient handling of semi-asynchronous RAID write failures using a processor device, the computer program product comprising a non-transitory computer-readable storage medium having computer-readable program code portions stored therein, the computer-readable program code portions comprising:
   a first executable portion that commits a write operation on a primary copy of data on a primary entity while sending the data to a secondary entity while awaiting an acknowledgment by the secondary entity, wherein the acknowledgment indicates to the primary entity that metadata for the write operation has arrived at the secondary entity with or without indicating that the data has committed on the secondary entity; and
   a second executable portion that sends the acknowledgment from the secondary entity regardless of a write failure and allowing the secondary entity to perform a recovery operation if a write failure occurs.

16. The computer program product of claim 15, further including a third executable portion that, if the secondary entity fails to commit the data on the secondary entity, performs at least one of:
   failing the write operation on the secondary entity, and
   triggering a rebuild process on the secondary entity to complete a full redundant state of the data on the secondary entity.

17. The computer program product of claim 16, further including a fourth executable portion that, if a double concurrent write failure occurs where the secondary entity is performing a retry of the write operation and the primary copy of the data on the primary entity is lost, performs each one of:
   forcing the secondary entity to become a new primary entity, and
   returning a read operation failure by the secondary entity to an application when a read operation of a stale data block arrives.

18. The computer program product of claim 17, further including a fifth executable portion that allows for one of internal recovery actions to be attempted and performing a new write operation to the stale data block for turning the stale data block to a valid data block by delaying a processing operation of the write failure of the secondary copy.

19. The computer program product of claim 15, further including a third executable portion that sets a mark on a data allocation table during the write operation on the secondary entity.

20. The computer program product of claim 19, further including a fourth executable portion that performs at least one of:
   marking the data block as stale in the data allocation table prior to the acknowledgment being sent by the secondary entity,
   using the acknowledgment for the write operation to return a success notification to the primary entity prior to committing the data on the secondary entity, and
   sending the acknowledgment from the secondary entity to the primary entity after the data block is marked as stale.

* * * * *